United States Patent
Berthias

(10) Patent No.: US 8,876,555 B2
(45) Date of Patent: Nov. 4, 2014

(54) VEHICLE GROUND-CONTACTING ELEMENT FORMING A HOLLOW BODY AND METHOD FOR MANUFACTURING SUCH A GROUND-CONTACTING ELEMENT

(75) Inventor: Gilles Berthias, Vigneux sur Seine (FR)

(73) Assignee: Peugeot Citroën Automobiles SA, Route de Gisy, Velizy Villacoublay (FR)

( * ) Notice: Subject to any disclaimer, the term of this patent is extended or adjusted under 35 U.S.C. 154(b) by 0 days.

(21) Appl. No.: 13/823,314

(22) PCT Filed: Nov. 24, 2011

(86) PCT No.: PCT/FR2011/052749
§ 371 (c)(1),
(2), (4) Date: Apr. 12, 2013

(87) PCT Pub. No.: WO2012/069765
PCT Pub. Date: May 31, 2012

(65) Prior Publication Data
US 2013/0189859 A1 Jul. 25, 2013

(30) Foreign Application Priority Data
Nov. 26, 2010 (FR) ...................................... 10 59806

(51) Int. Cl.
*H01R 13/648* (2006.01)
*B60B 27/00* (2006.01)

(52) U.S. Cl.
CPC ............. *B60B 27/00* (2013.01); *B60G 2206/50* (2013.01); *B60G 2206/8201* (2013.01); *Y10S 439/906* (2013.01)
USPC ...................................... 439/607.47; 439/906

(58) Field of Classification Search
CPC .................................................. Y10S 439/906
USPC ............ 439/95, 906, 607.47, 607.48, 607.49, 439/607.56, 607.57
See application file for complete search history.

(56) References Cited

U.S. PATENT DOCUMENTS

| | | | | | |
|---|---|---|---|---|---|
| 3,999,830 | A | * | 12/1976 | Herrmann et al. | ........ 439/607.47 |
| 5,199,903 | A | * | 4/1993 | Asick et al. | ............. 439/607.47 |
| 5,387,130 | A | * | 2/1995 | Fedder et al. | ............ 439/607.47 |

FOREIGN PATENT DOCUMENTS

| | | |
|---|---|---|
| EP | 1055586 A1 | 11/2000 |
| EP | 1593584 A1 | 11/2005 |

(Continued)

OTHER PUBLICATIONS

International Search Report from corresponding International Patent Application No. PCT/FR2011/052749 mailed Mar. 13, 2012.

(Continued)

*Primary Examiner* — Tho D Ta
(74) *Attorney, Agent, or Firm* — Polster, Lieder, Woodruff & Lucchesi, L.C.

(57) ABSTRACT

The invention relates to a vehicle ground-contacting element (1) comprising two shell-shaped portions (11,12) assembled together into at least one first (13a) and one second (13b) contact area such as to form a rigid hollow body, such that the first contact area (13a) is made up of a contact surface (18a) extending a first edge of the first shell (11) and a contact surface (19a) extending a first edge of the second shell (12), said two contact surfaces (18a, 19a) of the first contact area (13a) engaging with one another and extending the first edges in a first direction (X), the second contact areas (13b) being made up of a contact surface (18b) extending a second edge of the first shell (11) and a contact surface (19b) extending a second edge of the second shell (12), said two contact surfaces (18a, 19a) of the second contact area (13b) engaging with one another and extending the second edges in a second direction (Z), the first direction (X) and the second direction (Z) being oriented substantially perpendicular to one another.

10 Claims, 2 Drawing Sheets

(56) References Cited

FOREIGN PATENT DOCUMENTS

| | | |
|---|---|---|
| JP | 56082668 A | 7/1981 |
| JP | 10129225 A | 5/1998 |

OTHER PUBLICATIONS

International Search Report from corresponding International Application No. PCT/FR2011/052749 mailed Mar. 13, 2012.

* cited by examiner

VEHICLE GROUND-CONTACTING ELEMENT FORMING A HOLLOW BODY AND METHOD FOR MANUFACTURING SUCH A GROUND-CONTACTING ELEMENT

CROSS-REFERENCE TO RELATED APPLICATIONS

The present application is the U.S. national stage under 35 U.S.C. §371 of International Application No. PCT/FR2011/052749 having an international filing date of Nov. 24, 2011, which claims the priority of French application 1059806 filed on Nov. 26, 2010.

BACKGROUND

This invention relates to a ground contacting element for a vehicle, in particular of a motor vehicle.

It mainly relates to a vehicle ground-contacting element comprising two shell-shaped portions assembled together into at least one first and one second contact area so as to form a rigid hollow body. The contact areas thus formed are adapted so as to be able to offset the variations of size between the first and/or the second shell in order to guarantee the rigidity of the body thus formed.

EP 1593584 discloses a wheel hub, forming a vehicle ground contact element, consisting of two shells joined together so as to form a rigid hollow body. The assembly of these two shells is made by contact areas positioned around the periphery of each of these two shells. These contact areas are formed by a hanging edge of a first of the two shells crimped around an edge of the second shell. But this assembling method requires tight clearances at the connecting surface between the two shells, to prevent distortion of the first or second shell during the crimping operation.

A wheel hub has also been disclosed. The edge of the first shell is positioned directly in contact with the edge of the second shell; and a weld bead traverses the line of contact between these two shells. In order for the weld bead to rigidly retain these two shells together, it is necessary for the clearance along the line of contact between the two shells to be tight, requiring high dimensional restrictions during the stamping of each of these two shells.

Thus the two known embodiments always require the two shells to be produced by high precision manufacturing, increasing the cost and time of manufacturing such a rigid hollow body.

SUMMARY

A ground contact element for a vehicle comprises two parts which define shells. The two parts, or shells, are joined together by means of at least one first and one second contact area to form a rigid hollow body. The contact areas of the shells are adapted to compensate for variations in the dimensions between the first and/or second shell making it possible to limit the price and time of manufacturing for this type of a rigid hollow body.

To that end, a ground contacting element for a vehicle, in particular of a motor vehicle, is comprised of two parts in the form of a shell, joined together by means of at least one first and one second contact area which together form a rigid hollow body, such that the first contact area is made up of a connecting surface extending along a first edge of the first shell and of a connecting surface extending along a first edge of the second shell, these two connecting surfaces of the first contact area being pressed against each other and extending along the first edge of each of the two shells in a first direction (X). The second contact area is made up of one connecting surface extending along a second edge of the first shell and a connecting surface extending along a second edge of the second shell, these two connecting surfaces of the second contact area pressing against each other and extending along the second edge of each of the two shells in a second direction (Z). The first direction (X) and the second direction (Z) are oriented substantially perpendicular to each other, making it possible to compensate for variations in the size of the first and/or the second shell while optimizing the contact surface between the aforementioned connecting surfaces.

According to a first characteristic, the first shell is secured to the second shell by welding along the contact areas.

According to a second characteristic, the first and/or the second shell are made of sheet metal and are formed by stamping.

This ground contacting element is not limited to two contact areas. Other contact areas can be formed along the peripheral surface of each of the two shells. Openings are formed between the different contact areas. These openings are provided to fasten connecting or reinforcement elements. Within each of the two shells, an opening positioned in a substantially central area of said shell is also formed; these two openings are positioned opposite to each another, making it possible to fasten a support for a ball bearing.

Thus, such a ground contact element generally forms a pivot wheel to serve as a support and guide for the wheel of a vehicle.

A method of assembling a ground contact element comprising at least one of the foregoing characteristics is also disclosed. Such a ground contact element comprises a first part and a second part forming the shells, assembled together at least one first and one second contact area in order to form a rigid hollow body, the assembly of which comprises the following steps:

a first step comprising positioning the connecting surface of the first contact area of the first shell by resting against the connecting surface of the first contact area of the second shell, and by positioning the connecting surface of the second contact area of the first shell facing the connection surface of the second contact area of the second shell;

a second step comprising sliding the first shell or second shell in the first direction (X), positioning the connection surface to rest upon the second connection area of the first shell against the connection surface of the second contact area of the second shell; and a third step comprising forming the weld beads along the contact areas.

An intermediate step to adjust the spacing of the first shell with respect to the second shell can be interposed between the second and the third step, and comprises moving the edge of the first or second shell at the second contact area in the second direction (Z).

A final step is carried out which comprises securing fastening or reinforcement elements into the openings formed between said contact areas. This last step also comprises securing a support for a ball bearing into two openings, positioned opposite of each other, formed in a substantially central area of each of the two shells.

DESCRIPTION OF THE FIGURES

Other advantages and technical characteristics of this invention will become more apparent in light of the following description with reference to the attached drawings in which.

DETAILED DESCRIPTION

Figure 1:
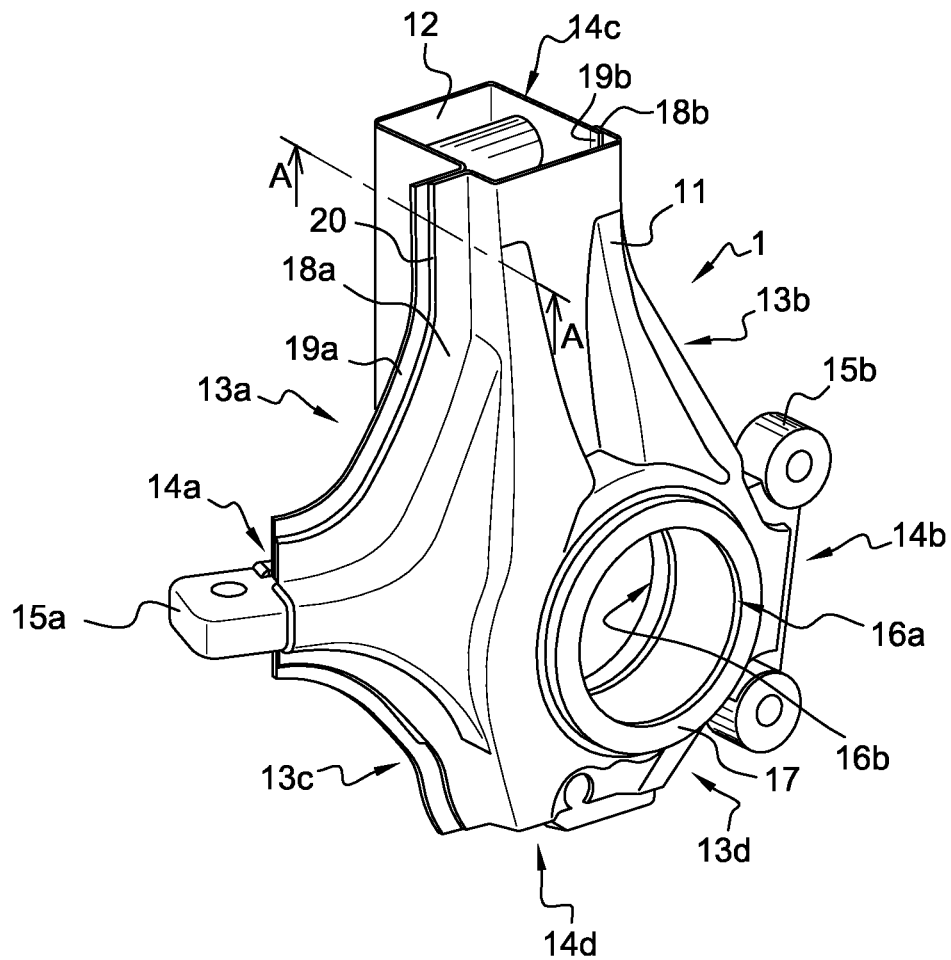
FIG. 1 is a view in perspective of a wheel hub, comprising a first shell and a second shell which, in combination, form a ground contact element.

FIG. 1 is a view in perspective of a wheel hub 1. This type of wheel hub 1 is a ground contact element for a motor vehicle. The wheel hub 1 comprising one first part 11 and one second part 12 in the shape of shells, assembled together at four connection areas 13a-d, thus forming a hollow body.

The first shell 11 is the front part of the wheel hub 1 which is positioned against the wheel and the second shell 12 is the rear portion. Between these contact areas 13a-d, the two shells 11 and 12 are non-contiguous parts, forming the openings 14a-d into which are positioned in various joining or reinforcing elements 15a-b for attaching the upper and lower suspension arms of the steering control rod and a brake caliper (suspension arms, steering control rod, and brake caliper are not shown). Thus, in the embodiment as shown:

- on a first, front, side of the wheel pivot 1, a first opening 14a is formed which receives a first support 15a making it possible to secure the wheel hub 1, the steering control rod;
- on the side opposite the wheel pivot 1, the rear side, a second opening 14b is formed which will receive a second support 15b forming two attachment points for the mounting of the brake caliper; and
- in the upper and lower parts of the wheel pivot 1, a third opening 14c and a fourth opening 14d are formed, making it possible to connect the upper and lower suspension arms to the wheel hub.

The contact areas 13a-d are distributed around the periphery of the wheel hub 1, delineated on each side by the openings 14a-d. The distribution of the contact areas 13a-d along the peripheral surface of the wheel hub 1, and thereby:

- the first contact area 13a is positioned between the first opening 14a and the third opening 14c of the wheel pivot 1;
- the second contact area 13b is positioned between the second opening 14b and the third opening 14c;
- the third contact area 13c is positioned between the first 14a opening and the fourth opening 14d; and
- the fourth contact area 13d is positioned between the second opening 14b and the fourth opening 14c.

In the central portion of each of the two front 11 and rear 12 shells, circular openings 16a and 16b are formed which allow a support 17 for a ball bearing in a wheel hub to be mounted. Each contact zone 13a-d between the front shell 11 and the rear shell 12 is formed by a connecting surface 18a-b of the front shell 11 coming into contact against a connecting surface 19a-b of the back shell 12. Weld seams 20 lock the front shell 11 with the rear shell 12 along these bonding surfaces 18a-b and 19a-b.

Figure 2:
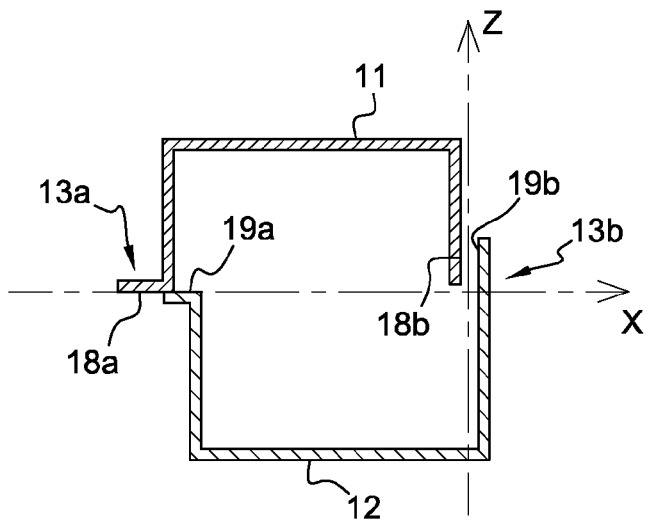
FIGS. 2 through 4 show the different steps which allow the assembly of the first shell to the second shell, thus forming the wheel hub.
Figure 3:
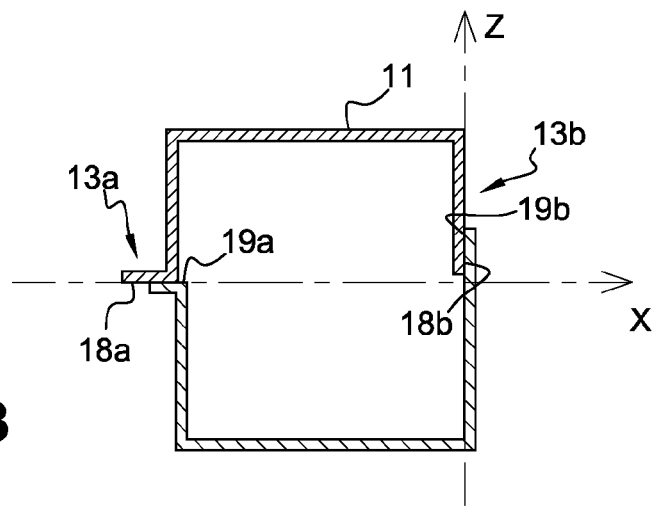
Figure 4:
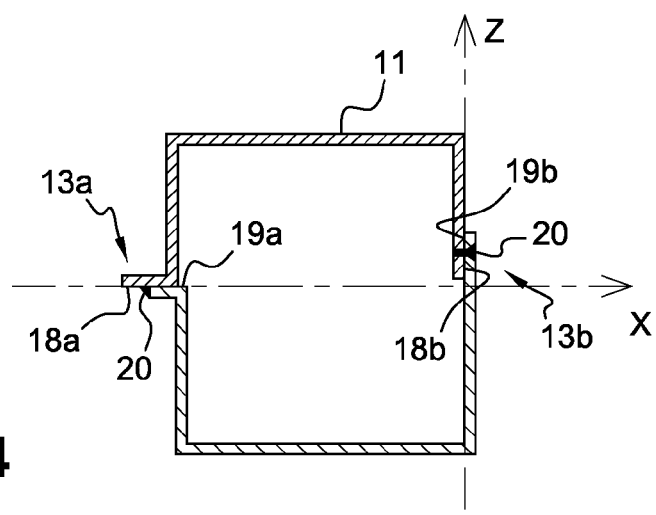

FIGS. 2-4 are cross-sectional views shown at line A-A as shown in FIG. 1 or the wheel hub 1 following the various steps for assembling the front shell 11 with the rear shell 12. This cut line A-A is positioned in the upper position of the wheel hub 1, knowing that the third contact area 13c and the fourth contact area 13d, which are positioned in the lower part of the wheel hub 1 are, respectively, similar to the first contact area 13a and to the second contact area 13b positioned in the upper part of the wheel hub 1.

FIG. 2 shows the first step for assembling the front shell 11 with the rear shell 12. This first step comprises positioning the front shell 11 with respect to the rear shell 12 so that:

- at the first contact area 13a, the connecting surface 18a of the front shell 11 may be positioned to rest against the connection surface 19a of the back shell 12; and
- at the second contact area 13b, the connecting surface 18b of the front shell 11 may be positioned with respect to the connection surface 19b of the back shell 12.

Thus, on the plane of section A-A, the connecting surfaces 18a-b of the front shell 11 and the connecting surfaces 19a-b of the back shell 12 extend in the following directions:

- at the first contact area 13a, the connecting surface 18a of the front shell 11 and the connecting surface 19a of the back shell 12 extend in the first direction X; and
- at the second contact area 13b, the connecting surface 18b of the front shell 11 and the connecting surface 19b of the back shell 12 extend in the second direction Z, with the first direction X and the second direction Z being oriented in a perpendicular manner relative to each other.

FIG. 3 shows the second step for assembling the front shell 11 with the rear shell 12. This second step comprises causing the front shell 11 to be transferred in direction X, guided in transfer by the connection surfaces 18a and 19a of the first contact area 13a, positioning the connecting surfaces 18b and 19b of the second contact area 13b on the contact plane.

An intermediate step (not shown) may be carried out. This intermediate step is to check the distance of the front shell 11 and the rear shell 12, delimiting the inside hollow volume of the wheel hub 1. The spacing of the second contact area 13b is adjusted by transferring the connection surface 18b the first shell 11 along the connecting surface 19b of the second shell 12 following the second direction Z. Such adjustment of the spacing of the first shell 11 with respect to the second shell 12 is made independently of the first contact area 13a, making it possible to compensate for variations in the size of the first shell 11 and/or the second shell 12.

FIG. 4 shows the third step for assembling the front shell 11 with the rear shell 12. This third step comprises attaching the front shell 11 to the rear shell 12 by means of weld seams 20 applied at the level of the different contact areas 13a-d, by following the connecting surfaces 18a-b and 19a-b.

In the embodiment as it is shown, at the level of the first contact area 13a, the weld seam 20 is at an angle. At the level of the second contact area 13b, the weld seam 20 is transmission welding, both weldings being performed by laser welding.

Once these shells are assembled, the different elements of union or reinforcement 15a-b, as well as the support 17 of the ball bearing of the wheel hub can be positioned and secured in the various openings 14a-d and 16a-b, the attachment being made by laser welding.

Of course, the various embodiments implemented above are in no way limiting and other details and improvements may be made to the invention without departing from the scope of the invention as set forth in the claims below. Particularly, the number of contact areas and the number of openings formed between the contact areas can be altered. The same applies to each contact area. The type of welding, whether at an angle, by transmission or fillet welding, for example by laser or electron beam, can vary according to industrial constraints or following specific constraints of accessibility in each contact area.

The invention claimed is:

1. A vehicle ground contact element for an automotive vehicle; the vehicle ground contact element comprising a first shell and a second shell joined together by means of at least one first contact area and one second contact area; the first and second shells, in combination, forming a rigid hollow body, wherein the first contact area comprises a contact surface extending along a first edge of the first shell and a contact surface extending along a first edge of the second shell; the two contact surfaces of the first contact area being pressed against each other and extending along the first edge of each of the two shells in a first direction (X); the second contact area comprising a contact surface extending along a second edge of the first shell and a contact surface extending along a second edge of the second shell; the two contact surfaces of the second contact area being pressed against each other and extending along the second edge of each of the two shells in a second direction (Z); the first direction (X) and the second direction (Z) being oriented substantially perpendicular to each other, making it possible to compensate for variations in the size of the first shell and/or the second shell while optimizing the contact surface among the contact surfaces; the ground contact element further including a central opening formed in a substantially central area of each of the two shells, said central openings being positioned opposite each other, making it possible to fasten a support for a ball bearing.

2. The ground contact element according to claim 1, wherein the first shell is secured to the second shell by welding along the contact areas.

3. The ground contact element according to claim 1, wherein the first shell and/or the second shell are made of sheet metal formed by stamping.

4. The ground contact element according to claim 1, further including additional contact areas are formed along the peripheral surface of each of the two shells.

5. The ground contact element according to claim 1, wherein said ground contact forms a wheel hub to serve as a support and guide for a vehicle wheel.

6. The ground contact element according to claim 1, wherein openings are formed between the contact areas.

7. The ground contact element according to claim 6, wherein union elements or reinforcement elements are received in said openings.

8. A method of assembling a ground contact comprising a first shell and a second shell joined together by means of at least one first contact area and one second contact area; the first and second shells, in combination, forming a rigid hollow body, wherein the first contact area comprises a contact surface extending along a first edge of the first shell and a contact surface extending along a first edge of the second shell; the two contact surfaces of the first contact area being pressed against each other and extending along the first edge of each of the two shells in a first direction (X); the second contact area comprising a contact surface extending along a second edge of the first shell and a contact surface extending along a second edge of the second shell; the two contact surfaces of the second contact area being pressed against each other and extending along the second edge of each of the two shells in a second direction (Z); the first direction (X) and the second direction (Z) being oriented substantially perpendicular to each other, making it possible to compensate for variations in the size of the first shell and/or the second shell while optimizing the contact surface among the contact surfaces; the method comprising:
- a first step of positioning the connecting surface of the first contact area of the first shell against the connection surface of the first contact area of the second shell, and positioning the connection surface of the second contact area of the first shell with respect to the connection surface of the second contact area of the second shell;
- a second step of sliding the first shell or second shell in the first direction (X), positioning the connection surface of the second contact area of the first shell against the connection surface of the second contact area of the second shell;
- a third step of forming the weld beads along the said contact areas; and
- a step of securing a support for a ball bearing into the two central openings positioned opposite of each other, in a substantially central area of each of the two shells.

9. The method of assembling a ground contact element according to claim 8, including an intermediate step of adjusting the spacing of the first shell with respect to the second shell is interposed between the second step and the third step the adjusting step comprising sliding the edge of the first or second shell along the second contact area in the second direction (Z).

10. The method of assembling a ground contact element according to claim 8, further comprising a step of securing fastening or reinforcement elements into the openings formed between said contact areas.

* * * * *